US008860736B2

(12) United States Patent  
Song et al.

(10) Patent No.: US 8,860,736 B2  
(45) Date of Patent: Oct. 14, 2014

(54) TERMINAL AND APPLICATION EXECUTION METHOD THEREOF

(75) Inventors: Jeongig Song, Seoul (KR); Ilho Lee, Suwon-si (KR); Youngwoo Ahn, Seoul (KR); Inchoon Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 13/592,284

(22) Filed: Aug. 22, 2012

(65) Prior Publication Data

US 2013/0050229 A1 Feb. 28, 2013

(30) Foreign Application Priority Data

Aug. 22, 2011 (KR) .................. 10-2011-0083541

(51) Int. Cl.

| G06F 15/16 | (2006.01) |
| G06F 15/00 | (2006.01) |
| G06T 1/00 | (2006.01) |
| G06F 9/50 | (2006.01) |

(52) U.S. Cl.

CPC ............... *G06F 9/505* (2013.01); *Y02B 60/142* (2013.01); *G06F 6/5044* (2013.01)  
USPC .......................................... 345/503; 345/501

(58) Field of Classification Search

CPC ............... G06F 15/00; G06F 15/16–15/161; G06T 1/00; G06T 1/0092  
USPC .......... 345/501, 503, 504; 717/136, 137, 140, 717/146  
See application file for complete search history.

(56) References Cited

U.S. PATENT DOCUMENTS

| 7,698,575 B2 * | 4/2010 | Samson ........................ 713/300 |
| 8,136,102 B2 * | 3/2012 | Papakipos et al. ............ 717/140 |
| 8,199,158 B2 * | 6/2012 | Samson et al. ................ 345/519 |
| 2006/0059494 A1 * | 3/2006 | Wexler et al. ................ 718/105 |
| 2008/0109795 A1 * | 5/2008 | Buck et al. .................... 717/137 |
| 2009/0027403 A1 * | 1/2009 | Jung ............................. 345/505 |

* cited by examiner

*Primary Examiner* — Jacinta M Crawford

(57) ABSTRACT

A terminal equipped with a central processing unit (CPU) and a graphics processing unit (GPU) performs a method for executing applications in adaptation to the load of the CPU and GPU. The application execution method of the present invention includes checking, when a code of application to be executed is input, workloads of a central processing unit and a graphics processing unit. The method also includes comparing the workloads of the central processing unit and the graphics processing unit with respective workload threshold values, and compiling the code according to comparison result. The method further includes generating a binary for executing the application at one of the central processing unit and the graphics processing unit using the compiled code, and executing the application with the generated binary. The method reduces application execution time by adjusting the workloads of the CPU and GPU according to the total workload, thereby saving power.

20 Claims, 5 Drawing Sheets

TERMINAL AND APPLICATION EXECUTION METHOD THEREOF

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Aug. 22, 2011, and assigned Serial No. 10-2011-0083541, the entire disclosure of which is hereby incorporated by reference.

TECHNICAL FIELD OF THE INVENTION

The present disclosure relates to a terminal and application execution method thereof and, in particular, to a terminal equipped with a Central Processing Unit (CPU) and a Graphics Processing Unit (GPU) and a method for executing applications in adaptation to the load of the CPU and GPU in the terminal.

BACKGROUND OF THE INVENTION

Until the early 1990's, the graphics card was a component such as an adaptor for converting the operation result of the Central Processing Unit (CPU) to a picture or text signal to be output on the screen. However, as the market of multimedia contents, especially game contents, has grown, the role of the graphics card has changed.

In some instances, the graphics card has been developed to give games a three-dimensional (3D) effect and to make the pictures vivid with various visual effects and texture enrichment techniques. Such a tendency has brought the Graphics Processing Unit (GPU) for the purpose of assisting the role of the CPU.

FIG. 1 is a block diagram illustrating a configuration of a terminal.

Referring to FIG. 1, the CPU 110 is responsible for controlling the conditions and operations of the overall components of the terminal. The CPU 110 is capable of interpreting and operating the command input for executing a specific application and outputting the result. That is, if a code corresponding to the application to be executed is input, the CPU 110 compiles the code into an executable binary. The CPU 110 executes the application through this binary.

The CPU 110 is also capable of controlling the communication unit 120 to communicate data with an external entity and processing various commands input by the user through the input unit 130. The CPU 110 is also capable of controlling the storage unit 140 to store the data generated by a specific application, input by the user, and received from the external entity.

The GPU 150 is a control unit designed for processing the graphics promptly and capable of processing the graphics-related binary. The GPU 150 is also capable of performing graphic operations related to various data displayed by the display unit 160.

Typically, the application execution method of a terminal is characterized in that the CPU processes all kinds of operations while the GPU processes only the graphics-related operations. The application execution method of the CPU is described in more detailed hereinafter.

FIG. 2 is a flowchart illustrating an application execution method.

Referring to FIG. 2, the CPU 110 receives the source code for executing an application at block 210 and compiles the source code at block 220. That is, the CPU 110 checks the dependency between variables and performs optimization to optimize the dependency by branch statements. Through dependency analysis, the CPU 110 is capable of adjusting the execution order of the commands to shorten the application execution time.

Next, the CPU 110 generates a binary to execute the action related to the corresponding application at block 230. Finally, the CPU 110 executes the corresponding application through the generated binary at block 240.

Recent GPUs tend to be equal or superior to the CPU in performance. Accordingly, studies are being conducted for the non-graphic processing of the GPU as well as the graphic processing.

However, since the programming interface and model are designed in consideration of a specific format for the graphic processing, it is difficult to design the GPU to process the non-graphic operations as the CPU. Although it is possible to use the GPU resource for non-graphic operations through the parallel processor programming, there is a problem in that a new programming language may be required. Also, since program codes operating on the CPU and GPU differ from each other, the codes compiled for the two processing units can neither be assigned resources in real time nor moved.

SUMMARY OF THE INVENTION

To address the above-discussed deficiencies of the prior art, it is a primary object of the present disclosure to provide a terminal and application execution method thereof to solve the above problem.

In accordance with an aspect of the present disclosure, an application execution method of a terminal includes checking, when a code of application to be executed is input, workloads of a central processing unit and a graphics processing unit; comparing the workloads of the central processing unit and the graphics processing unit with respective workload threshold values; compiling the code according to comparison result; generating a binary for executing the application at one of the central processing unit and the graphics processing unit using the compiled code; and executing the application with the generated binary.

Preferably, checking includes generating an intermediate code for generating a binary for use in the graphics processing unit from the input code.

Preferably, comparing includes determining whether the workload of the central processing unit is equal to or greater than a first workload threshold; and determining, when the workload of the central processing unit is equal to or greater than a first workload threshold, whether the workload of the graphics processing unit is equal to or greater than a second workload threshold.

Preferably, compiling includes compiling, when the workload of the graphic processing unit is less than the second workload threshold, the code to generate a binary for use in the graphics processing unit; and compiling, when the workload of the graphic processing unit is equal to or greater than the second workload threshold, the code to generate a binary for use in the central processing unit.

In accordance with another aspect of the present disclosure, a terminal for executing an application includes a central processing unit which checks, when a code of application to be executed is input, workloads of a central processing unit and a graphics processing unit, compares the workloads of the central processing unit and the graphics processing unit with respective workload threshold values, compiles the code according to comparison result, and generates a binary for executing the application at one of the central processing unit and the graphics processing unit using the compiled code; and a graphic processing unit which executes the application with the binary transferred by the central processing unit.

Preferably, the central processing unit generates an intermediate code for generating a binary for use in the graphics processing unit from the input code.

Preferably, the central processing unit determines whether the workload of the central processing unit is equal to or greater than a first workload threshold and determines, when the workload of the central processing unit is equal to or greater than a first workload threshold, whether the workload of the graphics processing unit is equal to or greater than a second workload threshold.

Preferably, the central processing unit compiles, when the workload of the graphic processing unit is less than the second workload threshold, the code to generate a binary for use in the graphics processing unit and compiles, when the workload of the graphic processing unit is equal to or greater than the second workload threshold, the code to generate a binary for use in the central processing unit.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
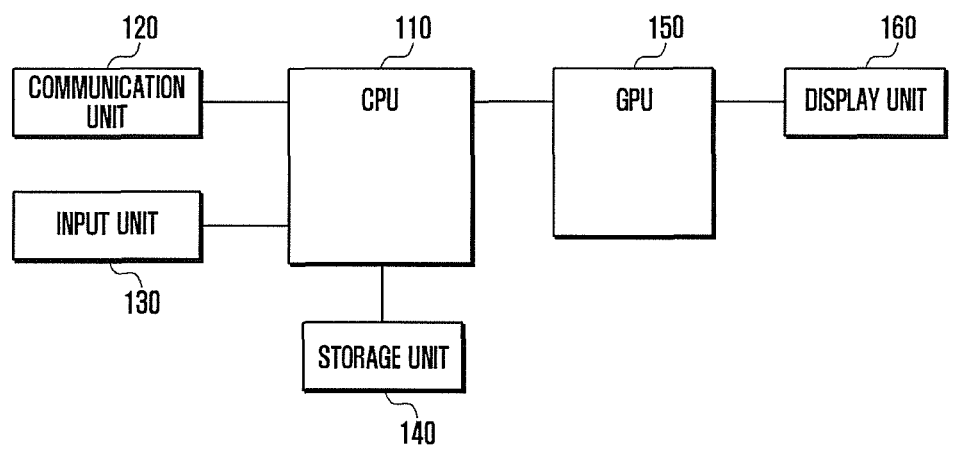
FIG. 1 is a block diagram illustrating a configuration of a terminal.
Figure 2:
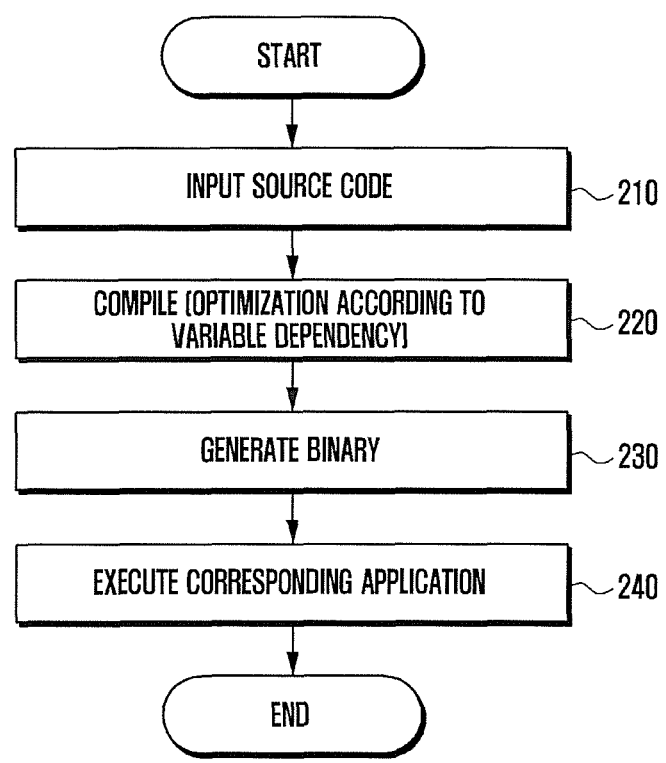
FIG. 2 is a flowchart illustrating an application execution method.
Figure 3:
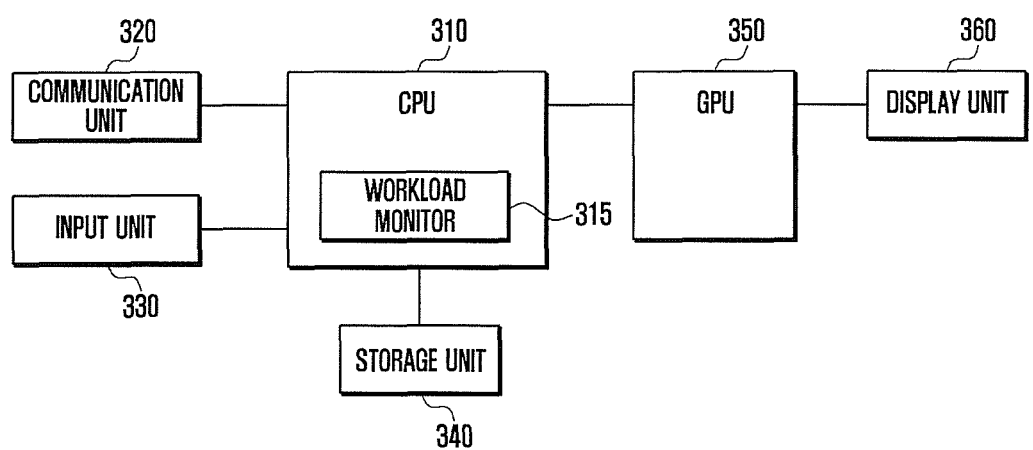
FIG. 3 is a block diagram illustrating a configuration of a terminal according to an embodiment of the present disclosure.
Figure 4:
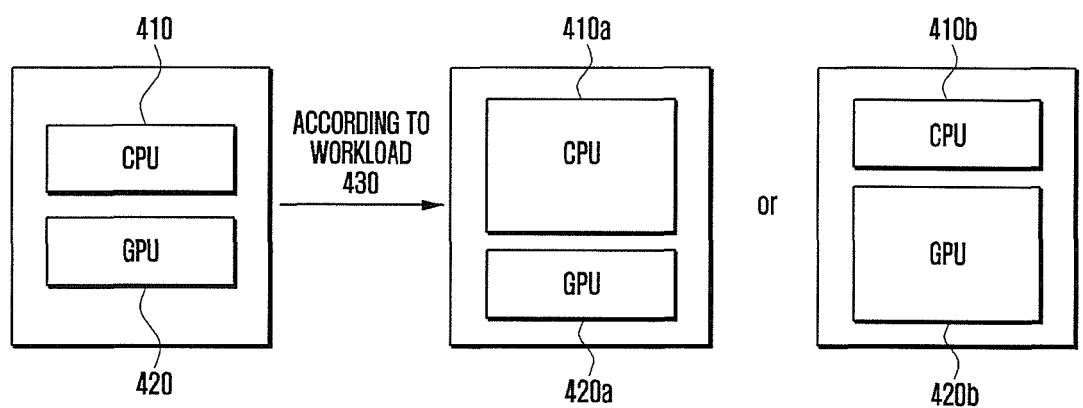
FIG. 4 is a diagram illustrating the principle of workload management of the CPU and GPU according to an embodiment of the present disclosure.
Figure 5:
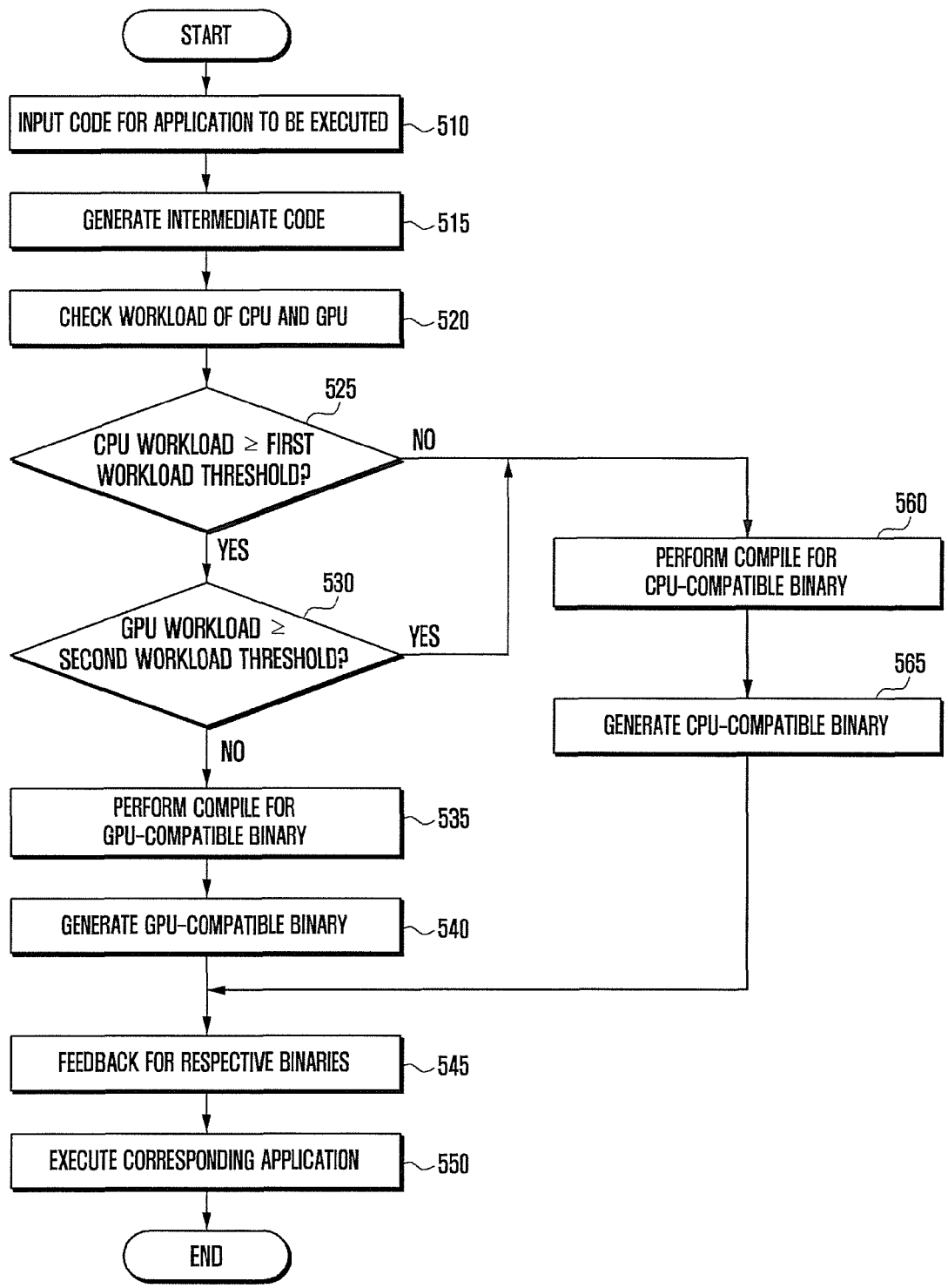
FIG. 5 is a flowchart illustrating an application execution method according to an embodiment of the present disclosure.

FIGS. 3 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The term 'terminal' denotes an information processing device for processing data received from and to be transmitted to an external entity. Here, the terminal can be any of a desktop computer, a laptop computer, a table PC, a portable device, a smart phone, and the like.

The term 'Central Processing Unit' (CPU) denotes a device for processing overall data at the terminal and is responsible for interpreting and executing commands input by the user and outputting the result. The role of the CPU includes operation/calculation tasks.

The term 'Graphics Processing Unit' (GPU) denotes a device responsible for processing graphics, including 3D graphics. When a terminal equipped with a GPU performs graphic related operations, the GPU can share the load of the CPU. Since the GPU is capable of processing a large amount of matrices and vectors, the GPU enables the terminal to execute the applications with such operations.

The term 'compiler' is a program or procedure for transforming an application written in high-level language into a target application in a format immediately executable in the terminal and equivalent to the source application in the meaning. That is, in order a terminal to execute a specific application, the application is transformed into a language which the terminal can understand. The program responsible for such task is referred to as compiler.

The application to be compiled is referred to as a native application, and the language used for writing the native application is referred to as source code. The compiled application is referred to as a target application, and the language of the target application is referred to as object language or target language. If an application is compiled into a target application, the application can be executed repeatedly as long as the native application is not modified.

The term 'binary' denotes an execution file composed of zeros and ones for executing the application. That is, the terminal compiles the source code of the application selected by the user into target language and generates the binary for executing the application.

The term 'workload' denotes the amount of task to be processed by the CPU and GPU.

The term 'intermediate code' denotes the code generated such that the normal operation processed by the CPU can be processed by the GPU also.

The operation principle of the present disclosure is described hereinafter with reference to accompanying drawings. Detailed descriptions of well-known functions and structures incorporated herein may be omitted to avoid obscuring the subject matter of the present disclosure. Further, the following terms are defined in consideration of the functionality in the present disclosure, and may vary according to the intention of a user or an operator, usage, and so forth. Therefore, the definitions should be understood on the basis of the overall content of the present specification.

FIG. 3 is a block diagram illustrating a configuration of a terminal according to an embodiment of the present disclosure.

As shown in FIG. 3, the terminal includes an operation control unit 310, a communication unit 320, an input unit 330, a storage unit 340, a graphics operation control unit 350, and a display unit 360.

The operation control unit 310 controls overall operations and conditions of the components constituting the terminal. Here, the operation control unit 310 is the Central Processing Unit (CPU).

The CPU 310 processes all kinds of data at the center of the terminal and analyzes the commands input by the user and outputs the analysis result. The basic role of the CPU 310 is to process operation/computation tasks. For example, if the user inputs a command for operation of '0+1', the CPU processes the operation to output '1' as the operation result. Here, the CPU 310 checks its workload and that of the GPU 350 to adjust the workloads of the two processing units.

The CPU 310 generates an intermediate code of the corresponding application in order for the GPU 350 to process the normal operations that are processed by the CPU 310. Here, the intermediate code is the code for converting the compiled code into the binary for the GPU 350 in order for the GPU 350 to execute the corresponding application, and can be a <For~> statement. That is if the code of the corresponding application includes a <For GPU> statement, this means that the code can be processed by the GPU 350 as well as the CPU 310.

The CPU 310 includes a workload monitor 315 for adjusting the workloads to be processed by the CPU 310 and GPU 350. Although the description is directed to a situation where the CPU 310 includes the workload monitor 315, the present disclosure is not limited thereto. That is, the workload monitor 315 is arranged between the CPU 310 and the GPU 350 and checks the binary delivered from the CPU 310 to the GPU 350 to determine the workloads to be processed by the respective processing units.

The workload monitor 315 checks the workloads of the CPU 310 and the GPU 350 to adjust the workloads to be processed by the CPU 310 and the GPU 350. If the intermediate code corresponding to the application to be executed is generated, the workload monitor 315 checks the workloads of the CPU 310 and the GPU 350. Next, the workload monitor 310 determines whether each of the workloads of the CPU 310 and the GPU 350 is equal to or greater than a predetermined processing amount threshold such that the CPU 310 is capable of adjusting the workload to be processed by the CPU 310 and the GPU 350.

In more detail, the workload monitor 315 determines whether the workload of the CPU 310 is equal to or greater than the first workload threshold. If it is equal to or greater than the first workload threshold, the workload monitor 315 determines whether the workload of the GPU 350 is equal to or greater than the second workload threshold. Here, the first and second workload threshold values are configured by the terminal manufacturer or the user and denote the workloads that the CPU 310 and the GPU 350 are capable of processing at the maximum efficiency. The first and second workload thresholds can be equal to each other or not equal according to the capabilities of the CPU 310 and the GPU 350.

If the workload of the GPU 350 is not equal to or greater than the second threshold, i.e. less than the second threshold, the CPU 310 checks this and compiles the application to a GPU-compatible binary such that the GPU 350 processes the corresponding application. Afterward, the CPU 310 generates the GPU-compatible binary as the execution file for the application to be executed by the GPU using the compiled target language. The CPU 310 feeds back the generated binaries to the workload monitor 315. Finally, the CPU 310 transfers the corresponding binary to the GPU 350 to execute the corresponding application.

The communication unit 320 is responsible for communicating data with an external entity under the control of the CPU 310. The input unit 330 delivers the command input by the user to the CPU 310. The storage unit 340 stores the data generated by specific applications, input by the user, and received from and to be transmitted to the external entity.

The GPU 350 is responsible for processing graphics of the terminal. That is, the GPU 350 performs graphic operations related to the data to be displayed by the display unit 360. In the present disclosure, the GPU 350 is capable of executing the corresponding application through the binary related to the normal operation that is delivered from the CPU 310.

The display unit 360 is capable of displaying the graphics data processed by the GPU 350.

FIG. 4 is a diagram illustrating the principle of workload management of the CPU and GPU according to an embodiment of the present disclosure.

Referring to FIG. 4, the CPU 410 and the GPU 420 perform compiling to generate a binary for executing an application. Depending on the workload to be processed, the workload is split between the CPU 410a and the CPU 420a differently as denoted by reference number 430 such that the CPU 410a is assigned a workload greater than that assigned to the GPU 420a, or vice versa (the CPU 410b is assigned a workload less than the GPU 420b).

The application executable by the terminal is written with a programming language (C, C++, BASIC, and the like). The applications executed by the respective CPU and GPU are written with different programming languages and grammars. The source codes of the application executable by the respective CPU and GPU are compiled by the respective compilers of the CPU and GPU. In order to achieve this, the CPU generates the intermediate code such that the applications compiled by the compilers can be shared by the compiler of the CPU or the GPU.

The intermediate code is the code generated using the code corresponding to the application such that the application executable by the CPU is to be executed by the GPU. That is, the intermediate code is the code generated by compiling the code constituting an application so as to be executed by the GPU. The intermediate code can be written in a <For> statement. That is, if a <For GPU> statement as intermediate code is included in the code of the corresponding application, this means that the code can be processed by the GPU.

In the present disclosure, the CPU is capable of generating an intermediate code and compiling the application code included in the intermediate code to generate a binary executable by the CPU and GPU. The CPU measures and predicts the workload at the start and end times of compiling and the time when the binary is actually operating on the respective CPU and GPU. The results are reflected to the compilers of the CPU and GPU such that the corresponding application code is converted to the binary executable by the CPU and GPU.

The CPU is also capable of measuring the workload at the compiling time by means of the workload monitor. The CPU is also capable of measuring the workload by checking the state of the storage unit shared by the CPU and GPU. The CPU is also capable of predicting the workload at the actual operation times of the binary on the CPU and GPU. In this situation, the CPU is capable of predicting the workload by extracting the information on the task (total number of tasks and take sizes) waiting in the wait queue.

The CPU is capable of adjusting the workloads to be processed by it and the GPU based on the measured workload. For example, if the workload to be processed by the CPU is equal to or greater than a predetermined threshold, the CPU is capable of increase the workload of the GPU according to predetermined ration. Also, if the workload to be processed by the GPU is equal to or greater than a predetermined threshold, the CPU is capable of reducing the workload of the GPU and increasing the workload of the CPU.

FIG. 5 is a flowchart illustrating an application execution method according to an embodiment of the present disclosure.

Referring to FIG. 5, the terminal receives the source code of the application to be executed at block 510 and generates an intermediate code corresponding to the source code at block 515. Next, the terminal checks the workloads of the CPU and the GPU at block 520.

Next, the terminal determines whether the workload of the CPU is equal to or greater than the first workload threshold at block 525. If the workload of the CPU is equal to or greater than the first workload threshold, the terminal determines whether the workload of the GPU is equal to or greater than the second workload threshold at block 530. Here, the first and second thresholds are the values configured by the terminal manufacturer or the user and denote the workloads that can be processed by the CPU and the GPU at their maximum efficiencies. The first and second workload thresholds can be equal to each other or not equal.

If the workload of the GPU is not equal to or greater than the second workload threshold, i.e. if less than the second workload threshold, the terminal compiles to generate the GPU-compatible binary such that the GPU is capable of processing the corresponding application. Through this procedure, the source code of the application to be executed is converted to the target language readable by the terminal. Next, the UE generates a GPU-compatible binary as the execution file for executing the application by means of the GPU using the target language compiled at block 540. Next, the terminal feeds back the binary at block 545 and then executes the corresponding application at block 550. Here, the host executing the corresponding application is the GPU.

Returning to block 525, if the workload of the CPU is not equal to or greater than the first workload threshold, the procedure goes to block 560. Also, if the workload of the GPU is equal to or greater than the second workload threshold at block 530, the procedure goes to block 560.

The terminal performs compiling for a CPU-compatible binary at block 560. The terminal generates the CPU-compatible binary at block 565. Next, the terminal feeds back the generated binary at block 545 and executes the corresponding application at block 550. In an embodiment, the host executing the corresponding application is the CPU.

Through the above procedure, the terminal is capable of adjusting the workloads of the CPU and the GPU. Since the normal operation executable by the CPU is expressed as intermediate code, the workload can be processed by the GPU as well as the CPU.

That is, the conventional CPU checks the dependency between variables to perform optimization when converting the source cove to the binary. The optimization is performed by searching for the false dependent variables in the compiled source code to remove the dependency and incur dependency with branch statements. The optimization works as a role of adjusting the execution order of commands (latency hiding) through dependency analysis.

According to an embodiment the present disclosure, the terminal equipped with both a CPU and a GPU performs compiling two times for the code written in the conventional method. The first compiling procedure is to convert code written for the CPU/GPU to an intermediate code. And the next compiling procedure converts the intermediate code to a binary according to the workloads of the CPU and GPU at the compiling timing based on the information about the hardware (bus, memory, etc.) used for data exchange between the CPU and GPU as well as the optimization of dependency. The converted binary is the execution file generated for the CPU or GPU to execute the corresponding application.

As described above, the application execution method of the present disclosure checks the workloads of the CPU and GPU at the compiling timing and converts the code of the corresponding application to a binary executable by the CPU and GPU, thereby achieving dynamic load balancing and improving the entire system throughput. The application execution method of the present disclosure is capable of reducing the application execution time by adjusting the workloads of the CPU and GPU according to the total workload, resulting in improvement of power saving effect.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for use with a terminal, comprising:
checking, after a code of an application to be executed is inputted, workloads of a central processing unit and a graphics processing unit;
comparing the workloads of the central processing unit and the graphics processing unit with respective workload threshold values;
compiling the code according to a result of the comparison;
generating a binary for executing the application at one of the central processing unit or the graphics processing unit using the compiled code; and
executing the application with the generated binary.

2. The method of claim 1, wherein checking comprises generating an intermediate code for generating the binary for use in the graphics processing unit from the input code.

3. The method of claim 2, wherein the intermediate code comprises a <For> statement.

4. The method of claim 2, wherein the intermediate code comprises a <For GPU> statement.

5. The method of claim 1, wherein comparing comprises:
determining whether the workload of the central processing unit is equal to or greater than a first workload threshold; and
determining, when the workload of the central processing unit is equal to or greater than the first workload threshold, whether the workload of the graphics processing unit is equal to or greater than a second workload threshold.

6. The method of claim 5, wherein compiling comprises:
compiling, when the workload of the graphic processing unit is less than the second workload threshold, the code to generate the binary for use in the graphics processing unit; and
compiling, when the workload of the graphic processing unit is equal to or greater than the second workload threshold, the code to generate the binary for use in the central processing unit.

7. The method of claim 1, further comprising:
feeding back the generated binary.

8. A terminal apparatus for use in a terminal and configured to execute an application, the terminal apparatus comprising:
a central processing unit configured to:
check, after a code of the application to be executed is inputted, workloads of the central processing unit and a graphics processing unit;

compare the workloads of the central processing unit and the graphics processing unit with respective workload threshold values;

compile the code according to a result of the comparison; and generate a binary for executing the application at one of the central processing unit or the graphics processing unit using the compiled code; and the graphic processing unit configured to execute the application with the binary transferred by the central processing unit.

9. The terminal apparatus of claim 8, wherein the central processing unit is configured to generate an intermediate code for generating the binary for use in the graphics processing unit from the input code.

10. The terminal apparatus of claim 9, wherein the intermediate code comprises a <For> statement.

11. The terminal apparatus of claim 9, wherein the intermediate code comprises a <For GPU> statement.

12. The terminal apparatus of claim 8, wherein the central processing unit is configured to determine whether the workload of the central processing unit is equal to or greater than a first workload threshold and determine, when the workload of the central processing unit is equal to or greater than the first workload threshold, whether the workload of the graphics processing unit is equal to or greater than a second workload threshold.

13. The terminal apparatus of claim 12, wherein the central processing unit is configured to compile, when the workload of the graphic processing unit is less than the second workload threshold, the code to generate the binary for use in the graphics processing unit and compile, when the workload of the graphic processing unit is equal to or greater than the second workload threshold, the code to generate the binary for use in the central processing unit.

14. The terminal apparatus of claim 8, wherein the central processing unit is configured to generate the binary and feedback the generated binary.

15. A terminal configured to execute an application, the terminal comprising:
a communication unit;
an input unit;
a display unit;
a central processing unit configured to:
check, after a code of the application to be executed is inputted, workloads of the central processing unit and a graphics processing unit;
compare the workloads of the central processing unit and the graphics processing unit with respective workload threshold values;
compile the code according to a result of the comparison; and
generate a binary for executing the application at one of the central processing unit or the graphics processing unit using the compiled code; and
the graphic processing unit configured to execute the application with the binary transferred by the central processing unit.

16. The terminal of claim 15, wherein the central processing unit is configured to generate an intermediate code for generating the binary for use in the graphics processing unit from the input code.

17. The terminal of claim 16, wherein the intermediate code comprises a <For> statement.

18. The terminal of claim 15, wherein the central processing unit is configured to determine whether the workload of the central processing unit is equal to or greater than a first workload threshold and determine, when the workload of the central processing unit is equal to or greater than the first workload threshold, whether the workload of the graphics processing unit is equal to or greater than a second workload threshold.

19. The terminal of claim 18, wherein the central processing unit is configured to compile, when the workload of the graphic processing unit is less than the second workload threshold, the code to generate the binary for use in the graphics processing unit and compile, when the workload of the graphic processing unit is equal to or greater than the second workload threshold, the code to generate the binary for use in the central processing unit.

20. The terminal of claim 15, wherein the central processing unit is configured to generate the binary and feedback the generated binary.

* * * * *